March 28, 1967   H. O. SCHRÖTER   3,310,994
TENSIONING LEVER MECHANISM FOR BRAKE LINKAGES
Filed Dec. 24, 1964   3 Sheets-Sheet 1
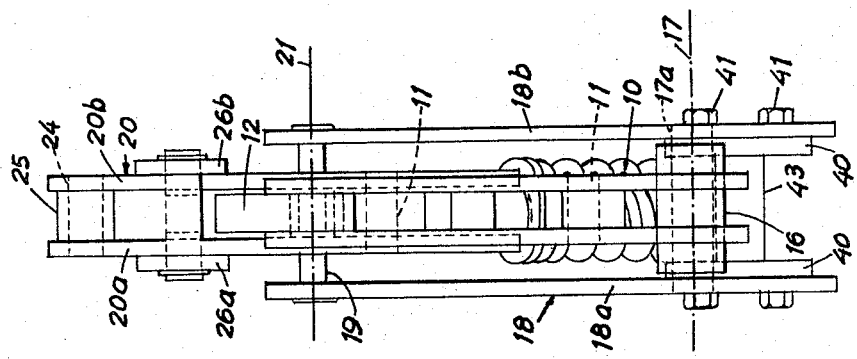
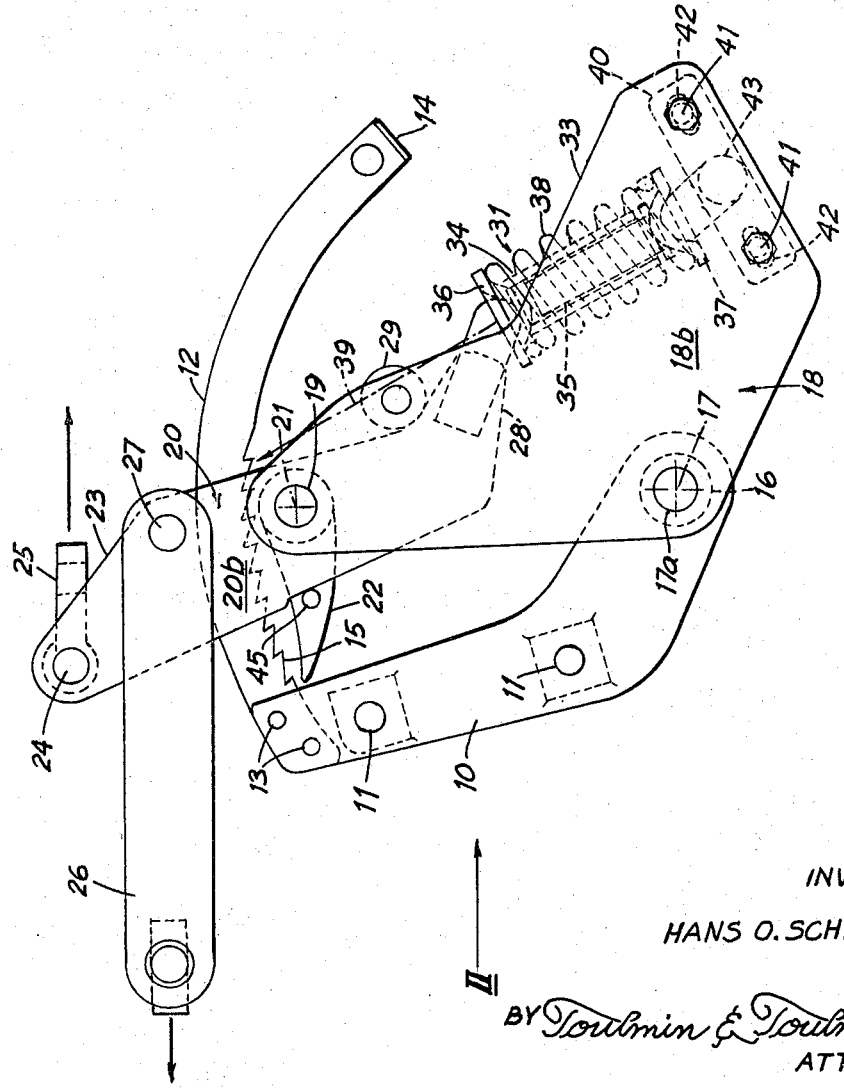
INVENTOR
HANS O. SCHRÖTER
BY Toulmin & Toulmin
ATTORNEYS March 28, 1967     H. O. SCHRÖTER     3,310,994
TENSIONING LEVER MECHANISM FOR BRAKE LINKAGES
Filed Dec. 24, 1964     3 Sheets-Sheet 2

INVENTOR
HANS O. SCHRÖTER

BY Toulmin & Toulmin
ATTORNEYS

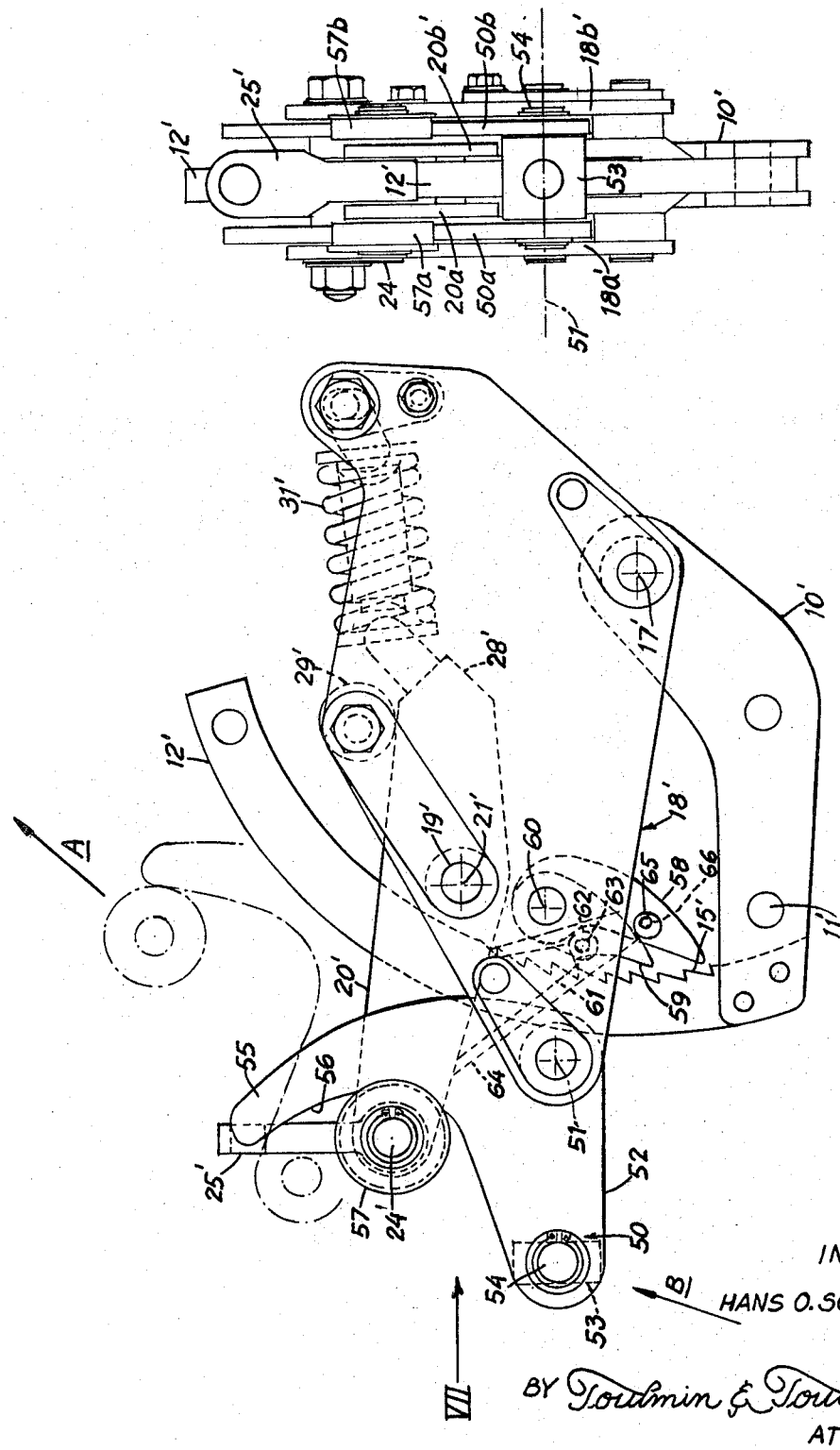

United States Patent Office 3,310,994
Patented Mar. 28, 1967

3,310,994
TENSIONING LEVER MECHANISM FOR BRAKE LINKAGES
Hans O. Schröter, Munich, Germany, assignor to Stopfix-Bremse Schroter & Co., Munich, Germany
Filed Dec. 24, 1964, Ser. No. 420,934
9 Claims. (Cl. 74—516)

This invention relates to tensioning lever mechanisms generally, and particularly ot two-stage, single stroke hand brake tensioners.

It is an object of this invention to provide tensioners with a first stage having rapid tensioning with low mechanical advantage and a second stage having an increased mechanical advantage.

According to the present invention, a main lever is pivoted to a supporting frame and a floating lever is pivoted to the main lever. An input member and an output member are connected to the floating lever. During the first stage operation the main lever and the floating lever rotate as a single unit and tension applied to the input member reacts directly on the output member. As more tension is applied, the floating lever and main lever rotate about different axes and the mechanical advantage of input to output is increased.

The invention may be carried into practice in various ways, but two specific embodiments will now be described by way of example, with reference to the accompanying drawings, in which:

FIGURE 1 is a side elevation of one form of brake tensioning lever mechanism;

FIGURE 2 is an end elevation of the mechanism as seen in the direction of the arrow II in FIGURE 1;

FIGURE 6 is a side elevation of a modified embodiment of brake tensioning mechanism; and FIGURE 7 is an end elevation of the mechanism as seen in the direction of the arrow VII in FIGURE 6.

Figure 3:
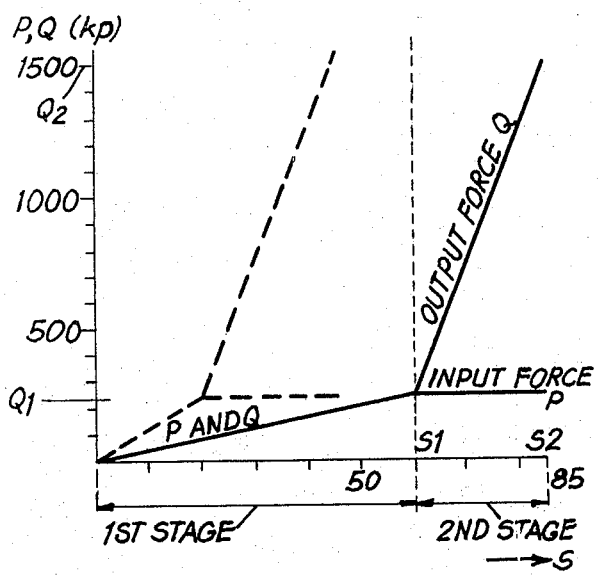
FIGURE 3 is a diagram showing graphically how the input force P and the output force Q of the tensioning mechanism of FIGURES 1 and 2 vary with the displacement S of the operating lever.

In the embodiment of FIGURES 1 and 2, the mechanism comprises a supporting frame member 10 formed with mounting holes 11 by means of which it can be bolted to a vehicle chassis or other support, and an arcuate ratchet 12 one end of which is rigidly secured by means of bolts or rivets 13 to an end of the frame member 10 and the other end 14 of which is free. The radially inner arcuate edge of the ratchet 12 is formed with a row of ratchet teeth 15 whose points are directed generally towards the free end 14 of the ratchet 12.

The frame member 10 carries a journal tube 16 whose axis 17 (refered to as the fixed pivot axis) is coaxial with the arcuate ratchet 12, and a pivot pin 17a extends through the journal tube 16. To opposite protruding ends of the pivot pin 17 are attached respectively a pair of spaced parallel lever plates 18a and 18b which lie one on either side of the frame 10 and together constitute a main lever 18 pivoted by means of the pin 17a to the frame 10 about the fixed pivot axis 17.

The plates 18a and 18b of the main lever 18 extend approximately to the toothed inner edge of the ratchet 12, where a second pivot pin 19 extends between them and provides a pivotal support for a floating lever 20, comprising two parallel lever members 20a and 20b extending between the main lever plates 18a and 18b one on either side of the ratchet 12. The axis 21 of the pivot pin 19 constitutes the moving pivot axis about which an intermediate point of the length of the floating lever 20 is pivoted to the main lever 18. Also pivoted on the pin 19 coaxially with the moving pivot axis 21, and between the two lever members 20a and 20b, is a pawl 22 which is spring loaded by spring means (not shown) into engagement with the teeth 15 of the ratchet 12.

The outwardly extending arm 23 of the floating lever 20 carries an outer coupling pin 24 at its outer end by which an actuating rod 25 constituting the input member is coupled to the floating lever 20. The actuating rod 25 may be coupled at its other end to a manual brake lever or other operative device. An output link 26 comprising spaced parallel strip members 26a and 26b is pivotally coupled to an intermediate point of the arm 23 of the lever 20 by means of a pin 27, the other end of the output link 26 being coupled in use to the brake linkage to be tensioned.

The floating lever 20 is also formed with an inwardly extending tail 28, which engages a stop roller 29 carried by the main lever 18 to limit the pivotal movement of the floating lever relative to the main lever in the anti-clockwise direction, as seen in FIGURE 1. The floating lever 20 is urged against the stop roller 29 by an over-center spring assembly 31 acting between the tail 28 of the floating lever and an anchorage 32 secured to an offset portion 33 of the main lever 18. The spring assembly 31 comprises a pair of telescoping sleeves 34 and 35 respectively, carrying dished end caps 36 and 37 between which a helical coil compression spring 38 acts. The hemispherical end of the lever tail 28 seats in the concave recess in the dished end cap 36, and the hemispherical end of the anchorage 32 seats in the dished end cap 37, so that the compressed spring assembly is trapped between them and exerts a thrust on the lever tail 28 along a line of action 39 corresponding to the axis of the coil spring 38. The spring assembly 31 can pivot at either end, however, to accommodate pivotal movement of the floating lever 20 about the axis 21. When the lever is in its initial position, as shown in FIGURE 1, in which it is against the roller stop 29, the line of thrust 39 of the spring assembly 31 passes to the right of the moving pivot axis 21 so that the spring pressure tends to keep the floating lever 20 pressed against the stop. If, however, the lever 20 is turned in the clockwise direction in FIGURE 1, the spring assembly 31 will be pivoted by the tail 28 of the lever until the line of thrust 39 reaches the dead-center position in which it intersects the moving pivot axis 21, in which position the compression loading of the spring is at its maximum. Further movement of the floating lever 20 in the clockwise direction will be assisted by the thrust of the spring assembly directly its line of thrust 39 has passed through the dead-center position to the left of the pivot axis 21, in FIGURE 1. It will be seen that the anchorage 32 includes a plate 40 which is secured to the main lever 18 by means of bolts 41 passing through slots 42, whereby the position of the anchorage 32 is adjustable along the length of the slots 42, which extend generally transversely to the line of thrust 39 of the spring assembly. The plates 40 are interconnected by a bracing tube 43 which carries a post 44 whose hemispherical end seats in the end cap 37. When the floating lever 20 is in its initial position against the roller stop 29, as shown in FIGURE 1, the edge of the floating lever 20 engages an abutment pin 45 carried by the pawl 22 to lift the pawl clear of the teeth of the ratchet 12.

Figure 5:
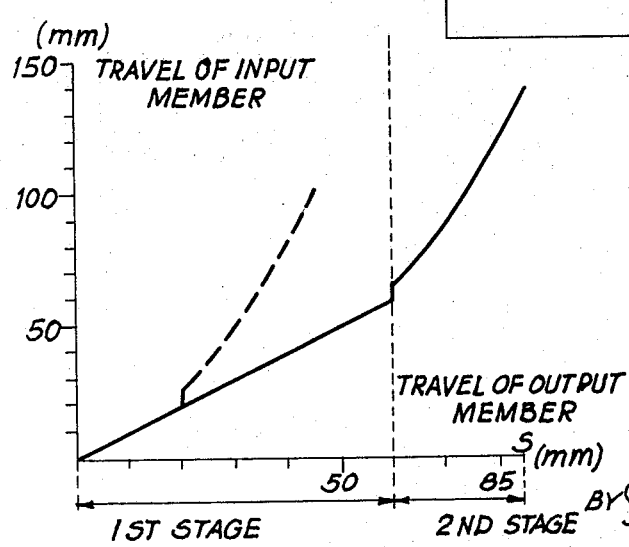
FIGURE 5 is a velocity ratio diagram of the mechanism of FIGURES 1 and 2.

If now an actuating force is applied to the input rod 25 in the direction of its longitudinal axis, this will initially cause the two levers 18 and 20 to rotate in unison as a rigid body about the fixed pivot axis 17, the pre-loaded spring assembly 31 holding the floating lever 20 firmly against the roller stop 29 and the pawl 22 being held clear of the ratchet teeth 15 by the abutment pin 45. This combined pivotal movement of the two levers about the fixed pivot axis 17 will apply a corresponding tensioning movement to the output link 26 towards the right, in FIGURE 1, the velocity ratio of the mechanism during this initial stage of the movement being constant at approximately 1:1, as indicated in FIGURE 5. As the output link 26 is moved towards the right, in FIGURE 1, however, it will tension the associated brake linkage and a reaction will be transmitted from the linkage through the output link 26 to the arm 23 of the floating lever 20. When this reaction reaches a certain value, at the end of the first stage of operation of the mechanism, it will overcome the pre-loading stress of the spring assembly 31 and will tend to turn the floating lever 20 in the clockwise direction of FIGURE 1, about the moving pivot axis 21, so that the spring assembly 31 is further compressed by the tail 28 of the floating lever 20. As the floating lever 20 leaves the roller stop 29, it will allow the pawl 22 to move into engagement with the ratchet teeth 15 to hold the main lever 18 in the position to which it has advanced, and this engagement will prevent the return movement of the main lever 18 about the pivot axis 17. The continued application of an increasing operating force to the actuating rod 25 during the second stage of operation of the mechanism will now rotate the floating lever 20 about the moving pivot axis 21 relative to the stationary main lever 18, thereby producing a continued tensioning movement of the output link 26 with an increased velocity ratio, corresponding to ratio of the turning moment arms of the output link 26 to that of the input rod 25 about the moving pivot axis 21. This increased velocity ratio will initially be in the region of 2:1 and, as shown in FIGURE 5, increases progressively throughout the remainder of the operating stroke, giving a corresponding increasing mechanical advantage to the lever mechanism throughout the second stage of tensioning of the brake linkage.

Thus the tensioning mechanism described enables the slack in the associated brake linkage to be taken up and the initial tensioning to be applied to the linkage at a relatively low velocity ratio over the first part of the operating stroke of the input rod 25. After the brake link has been tensioned to a certain extent sufficient to overcome the pre-loading of the spring assembly 31 and take up the clearances, the continued tensioning of the linkage is performed at a progressively increasing velocity ratio and with correspondingly increasing mechanical advantage to enable a high final tensioning force to be applied to the brake linkage via the output link 26 during the latter part of the operating stroke of the input rod 25.

Furthermore, it will be seen that during the latter stage of tensioning in which the floating lever 20 rotates relative to the main lever 18 about the moving pivot axis 21, the line of action 39 of the spring assembly 31 will pass through the dead-center position corresponding to maximum spring loading, and thereafter the thrust of the spring assembly 31 will be assisting the actuating force applied by the input rod 25 to effect the final tensioning of the brake linkage by turning the floating lever in the clockwise direction of FIGURE 1, about the pivot 21, instead of opposing the actuating force, and will thereby correspondingly reduce the effort required to complete the final tensioning of the linkage. Provided that the spring 38 is sufficiently strong, the thrust of the spring assembly 31 in its over-center position may be sufficient to hold the brake linkage in its fully tensioned condition until such time as the input rod 25 is positively returned to release the brakes.

To release the tensioned brake linkage, the input rod 25 is moved towards the left and turns the floating lever 20 about the movable pivot axis 21 in the counter-clockwise direction of FIGURE 1, the main lever 18 remaining held against return movement by the engagement of the pawl 22 in the ratchet 12, until such time as the floating lever 20 again reaches its initial position in engagement against the roller stop 29, and its edge 45 engages the abutment pin 46 to lift the pawl clear of the ratchet teeth and allow the return movement of the main lever 18, thus fully releasing the brake.

For an efficient design of tensioning mechanism operating in two stages with varying velocity ratio as described, it is necessary to design the tensioning mechanism so that throughout the second stage the mechanical advantage should increase progressively with displacement to a maximum to match the increasing output force required to overcome the brake linkage reaction and apply the required increasing braking force. Moreover, it is required to provide this progressively increasing output force by means of an input force applied to the input member of the tensioning mechanism which throughout the duration of the second stage of the operating stroke remains substantially constant, and without an excessive travel of the input member which might prevent the maximum braking force being applied within the limit of the operating stroke. In this way the best use is made of the available travel of the input member.

Referring now to FIGURE 3, the curves shown in full lines show the variation of input force P and output force Q with displacement S of the output member 26 of the mechanism of FIGURES 1 and 2, under clearance conditions employing the whole useful operating stroke of the mechanism corresponding to the maximum available output displacement of 85 mm. applied are somewhat curved for tensioning purposes to the brake linkage. FIGURE 3 has been simplified by showing the lines as straight, whereas, in fact, the lines are somewhat curved. The first 60 mm. of travel constitutes the first stage of the operating stroke during which the brake shoe clearances are taken up. During this stage the input force rises at a constant rate to its maximum value $P=240$ kg. reached at displacement $S_1$ while the output or tensioning force reaches a value $Q_1$ which is also equal to 240 kg., the velocity ratio and mechanical advantage both being constant at about 1:1 during this stage.

During the second stage, from $S_1$ to $S_2$, the input force P remains constant at P but the output force rises at a substantially uniform rate from $Q_1$ at $S_1$ to $Q_2$ at $S_2$.

During this second stage the mechanical advantage $i$ at displacement S determines the output force, in accordance with the equation $$Pi=Q \tag{1}$$

From FIGURE 3 it also follows that at any displacement S $$Q_2=MS+Q_1 \tag{2}$$

where M is a constant corresponding to the rate of increase of Q with displacement S over the whole of the second stage, i.e., $$M=\frac{Q_2-Q_1}{S_2-S_1} \tag{3}$$

From (1) and (2) is derived the expression $$i=\frac{MS+Q_1}{P} \tag{4}$$

Thus, if the required constant value of P is known for the second stage, for example 240 kg. in FIGURE 3, and also the initial value of output force $Q_1$, which is also 240 kg., the required value of the mechanical advantage $i$ at any displacement S can be derived from the Equation 4 to ensure that the mechanism will provide the required maximum output force $Q_2$, in this case 1500 kg., at the end of the operating stroke corresponding to displacement $S_2$.

The constant M is derived by measurement of the physical characteristics of the brake linkage with which the tensioning mechanism is to be used, measurements being made of the displacements of the input end of the brake linkage under several differing tension forces applied to the input end of the linkage after the brake shoes have been brought into engagement with their cooperating friction surfaces. The displacement of the input end of the brake linkage, which corresponds to the displacement S of the tensioning mechanism, arises from the cumulative resilient deformations of all the successive elements in the train constituting the brake linkage. In this way a force/displacement diagram is constructed for the associated brake linkage, and the constant M corresponds to the mean gradient of this diagram between the point at which the brake shoe clearance is first taken up and the point of maximum required brake application.

The tensioning mechanism of FIGURES 1 and 2 is, therefore, designed with appropriate dimensioning and geometry of its parts to provide a mechanical advantage ($i$) which varies in accordance with the requirements of the Equation 4 over the whole of the second stage of its operating stroke, the values of M, P and $Q_1$ being calculated to suit the particular brake linkage with which the tensioning mechanism is to be employed.

In FIGURE 3 the broken line curves show the input and operating force characteristics in the case where the initial brake clearance distance is smaller, so that the first stage of the operating stroke is shorter.

Figure 4:
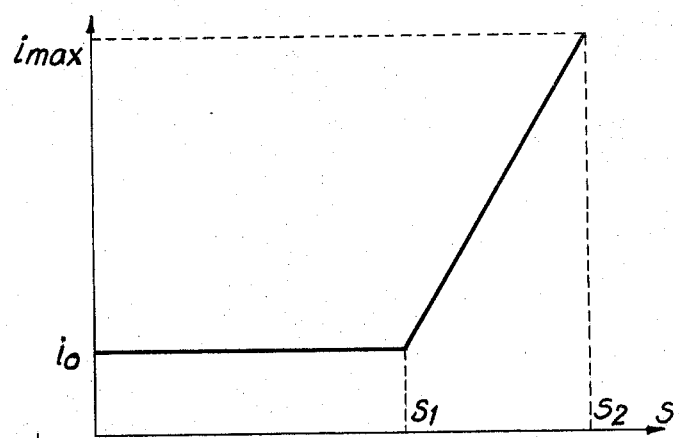
FIGURE 4 is a diagram showing the relationship between the mechanical advantage $i$ of the mechanism and the displacement S.

FIGURE 4 is a graph showing how the mechanical advantage $i$ varies with displacement S. It will be seen that $i$ is constant at $i_0$ during the first stage of the operating stroke, but increases progressively in accordance with Equation 4 during the second stage to a maximum value $i_{max}$ at $S_2$.

The embodiment of FIGURES 6 and 7 is similar in many respects to that of FIGURES 1 and 2, and similar parts are given the same reference numerals but distinguished by the suffix '. Thus as before, the main lever 18' comprises two plates 18a' and 18b' pivoted to the frame 10' about the fixed pivot axis 17', and lying one on either side of the arcuate ratchet 12', and the floating lever 20' is pivoted to the main lever 18' about the moving pivot axis 21' and is acted on by the over-center spring assembly 31'. The actuating rod 25' constituting the input member to the mechanism from the brake hand lever or other device, is coupled as before to the outer end of the floating lever 28' by means of the pin 24', but a different arrangement is provided for coupling the brake linkage to be tensioned to the mechanism.

Thus in this case the output member of the mechanism comprises a bell-crank lever 50 which is pivoted to the main lever 18' about a pivotal axis 51 radially outside the arcuate ratchet 12'. The bellcrank lever comprises two parallel lever plates 50a and 50b extending one on either side of the floating lever 20'. One arm 52 of the bellcrank lever 50 is pivoted at its outer end to the brake linkage by means of a coupling 53 and pivot pin 54. The other arm 55 of the bellcrank lever 50 is provided with a cam surface 56 on the edge of each of the lever plates 50a, 50b and a roller cam follower 57 constituted by a pair of rollers 57a and 57b is carried on the outer end of the floating lever 20', one of the two rollers 57a and 57b being mounted on each end of the pivot pin 24' protruding beyond the two plates 20a' and 20b' of the floating lever 20'. The two rollers 57a and 57b are respectively engaged with the cam profiles 56 formed on the lever plates 50a and 50b.

In this case the pawl means provided for engagement with the teeth 15' of the ratchet 12' comprises two coaxial pawls 58 and 59 pivoted to the main lever 18' about a common pivotal axis 60 spaced from the moving pivot axis 21'. The pawls 58 and 59 are mounted between the two main lever plates 18a' and 18b' radially inside the toothed inner edges of the ratchet 12', and the pawls 58 and 59 are of unequal radius, their tips engaging the ratchet teeth 15' at points spaced apart circumferentially along the toothed inner edge of the ratchet 12' by a distance equal to an odd multiple of the ratchet tooth pitch. This ensures that when the tip of either pawl is in engagement with a ratchet tooth the tip of the other pawl will be half-way between two ratchet teeth, an arrangement which reduces back-lash and results in a quick acting pawl and ratchet mechanism. The floating lever 20' carries an extension arm 61 arranged to engage a circular stop 62 eccentrically mounted on the shorter pawl 59 by means of a screw 63. When the floating lever 20' is moved in the counter-clockwise direction into its starting position, in which its tail 28' is engaged against the stop 29' on the main lever 18', the end of the extension arm 61 engages the stop 62 to lift the pawl 59 clear of the ratchet 15'. The longer pawl also carries an eccentrically mounted circular stop 65 by means of screw 66 which is similar to the stop 62, and which is arranged to be engaged by a second extension arm 64 on the floating lever 20', longer than the arm 61, so as to lift the pawl 58 clear of the ratchet teeth independently of the shorter pawl 59. Thus when the lever 20' is moved to its starting position both pawls will be held clear of the ratchet teeth 15'. In FIGURE 6 the pawls 58, 59 are shown raised a little further from the ratchet teeth 15' than they would be raised by the extension 60, for the sake of clarity. The arrangement described, in which the two pawls 58 and 59 are lifted and lowered independently of one another by separate extension arms carried by the floating lever 20', ensures secure latching of the main lever 18' by one of the two pawls 58 and 59 even if the other pawl should impinge on the tip of a ratchet tooth.

The operation of the embodiment of FIGURES 6 and 7 is generally similar to that of FIGURES 1 and 2. Thus during the initial part of an operating stroke effected by the application of an operating force in the direction of the arrow A to the input rod 25', the main lever 18' and the floating lever 20' rotate in unison about the fixed pivot axis 17', carrying with them the bellcrank lever 50, so that the output coupling 52 is moved at a relatively low velocity ratio to take up the slack and apply an initial tensioning force to the associated brake mechanism in the direction of the arrow B. When the reaction transmitted from the partly tensioned brake mechanism through the bellcrank lever 50 is sufficient to overcome the pre-loading of the spring assembly 31', further tensioning movement of the input rod 25 in the direction A results in the relative rotation of the floating lever 20' about the moving pivot axis 21'. This causes the rollers 57 to travel along the cam profiles 56 of the arms 55 of the bellcrank lever as the floating lever 20' turns, and produces rotation of the bellcrank lever 50 about its pivot axis 51 on the main lever 18' to complete the tensioning of the brake linkage with a progressively increasing overall velocity ratio and a correspondingly increasing mechanical advantage over the whole second stage of the operating stroke, the pawls 58 and 59 engaging the ratchet teeth 15' to prevent the return movement of the main lever 18' about the fixed pivot axis 17'. The characteristic curve of overall mechanical advantage of the tensioning lever mechanism during the second stage of the tensioning stroke depends upon the selected profiles of the cam edges 56, which are designed to produce a characteristic according to the Equation 4 above, determined with reference to the predetermined force/travel characteristic of an associated brake linkage just as described in connection with the embodiment of FIGURES 1 and 2.

The double pawl arrangement described with reference to FIGURES 6 and 7, in which two coaxial pawls are provided which are lifted and lowered by stop means independently of one another to ensure secure latching with the ratchet, may also be employed in the embodiment of FIGURES 1 and 2 instead of the single pawl 22.

According to a further feature of the present invention, the output member may conveniently be coupled to the floating lever at a point spaced in the tensioning direction from the plane through moving pivotal axis and the point of attachment of the input member to the floating lever.

The ratchet means conveniently comprises an arcuate ratchet member whose ratchet teeth face in the inward radial direction and which is secured to the supporting frame coaxially with the fixed pivot axis, and pawl means pivoted to the main lever and spring loaded into engagement with the ratchet teeth.

In one form of the invention the floating lever has an arm which extends outwardly from the moving pivot axis, the coupling means of both the input and output members being directly attached to the lever arm.

In this arrangement the input member coupling means may be directly attached to the outer end of the lever arm, while the output member coupling means is directly attached to the point of the lever arm intermediate between its outer end and the moving pivot axis.

In another form of the invention, however, the input member coupling means is directly attached to the outwardly extending lever arm but the output member coupling means comprises a bellcrank lever carried by the main lever and pivoted thereto about a pivot axis parallel to but spaced from the fixed and moving pivot axes, the output member coupling means being directly attached to one arm of the bellcrank lever and the other arm of the bellcrank lever constituting a cam member engaged behind and cooperating with a cam follower carried by the outer arm of the floating lever, whereby pivotal movement of the floating lever relative to the main lever about the moving pivot axis in the tensioning direction is transmitted through the inter-engaging cam follower and cam to pivot the bellcrank lever and thus to apply a tensioning movement to the output member.

In this arrangement the pawl means may comprise a pair of pawls pivoted coaxially to the main lever about an axis parallel to but spaced from the moving pivot axis, the tips of the two pawls engaging the ratchet at points whose distance apart measured along the length of the ratchet is an odd multiple of half the pitch of the ratchet teeth, thereby ensuring quick engagement of the ratchet and pawl mechanism with reduced back-lash.

The pre-loaded spring means may comprise a spring assembly carried by the two levers and acting between them to tend to pivot them relative to one another about the movable pivot axis away from a dead-center position in which the line of action of the spring assembly intersects the movable pivot axis.

Preferably the spring means is pivotally mounted between the levers and is arranged so that the line of action of the spring assembly passes through the said dead-center position during the full stroke of travel of the floating lever relative to the main lever in the tensioning direction, the maximum loading of the spring assembly occurring in the dead-center position.

The floating lever may be formed with an inwardly extending tail, the spring assembly acting between the pivotal anchorage on the tail and pivotal anchorage on the main lever.

In a convenient construction of the mechanism of the present invention, the main lever comprises two parallel inter-engaging lever arms pivoted one on either side of the supporting frame with the arcuate ratchet extending between them, and the floating lever comprises two parallel inter-connected lever members pivotally mounted between the two main lever members and extending one on either side of the arcuate ratchet.

It will be understood that this invention is susceptible to modification in order to adapt it to different usages and conditions, and accordingly, it is desired to comprehend such modifications within this invention as may fall within the scope of the appended claims.

What is claimed is:
1. A tensioning lever mechanism comprising;
 (a) a supporting frame having a fixed pivot axis;
 (b) a main lever pivoted about said pivot axis, said main lever having a movable pivot axis parallel to and spaced from said fixed pivot axis;
 (c) a floating lever pivoted on said movable pivot axis;
 (d) releasable ratchet means acting between said main lever and said supporting frame and operable when engaged to permit pivotal movement of said main lever on said main frame in only one angular direction;
 (e) means for coupling an input member to said floating lever at a first point radially spaced from said movable pivot axis;
 (f) means for coupling an output member to said floating lever at a second point intermediate said movable pivot axis and said first point;
 (g) stop means mounted on said main lever and co-operating with said floating lever whereby said floating lever is held in an initial position relative to said main lever;
 (h) overcenter prestressed spring means coupled to said main lever and said floating lever bearing said floating lever against said stop means, said prestressed spring means yielding in response to a predetermined torque exerted on said floating lever and passing over said center, said floating lever when resting against said stop means holding said ratchet means in released position and releasing said ratchet means to engaged position upon moving away from said stop means, the location of said first and second points on said floating lever being such that the ratio of the lever arm of the input member about said movable pivot axis to the lever arm of the output member about said movable pivot axis increases continuously throughout the operative range of angular movement of said floating lever about said movable pivot axis.

2. A tensioning lever mechanism comprising;
 (a) a supporting frame having a fixed pivot axis;
 (b) a main lever pivoted about said pivot axis, said main lever having a movable pivot axis parallel to and spaced from said fixed pivot axis;
 (c) a floating lever pivoted on said movable pivot axis;
 (d) ratchet means comprising a single radially inwardly facing arcuate ratchet mounted on said supporting frame coaxial with said fixed pivot axis and a cooperating pawl means pivotally mounted on said main lever;
 (e) means for coupling an input member to said floating lever at a point radially spaced from said movable pivot axis;
 (f) means for coupling an output member to said floating lever at a second point intermediate said movable pivot axis and said first point;
 (g) stop means mounted on said main lever and co-operating with said floating lever whereby said floating lever is held in an initial position relative to said main lever;
 (h) overcenter prestressed spring means coupled to said main lever and said floating lever bearing said floating lever held against said stop means, said prestressed spring means yielding in response to a predetermined torque exerted on said floating lever and passing over said center, said floating lever when resting against said stop means holding said ratchet means in released position and releasing said ratchet means to engaged position upon moving away from said stop means, the location of said first and second points on said floating lever being such that the ratio of the lever arm of the input member about said movable pivot axis to the lever arm of the output member about said movable pivot axis increases continuously throughout the operative range of angular movement of said floating lever about said movable pivot axis.

3. A tensioning lever mechanism comprising;
 (a) a supporting frame having a fixed pivot axis;
 (b) a main lever pivoted about said pivot axis, said main lever having a first movable pivot axis parallel to and spaced from said fixed pivot axis, and a second movable pivot axis parallel to and spaced from said fixed pivot axis and said first movable pivot axis;
 (c) a floating lever pivoted on said first movable pivot axis having a third movable pivot axis mounted thereon;

(d) an input member coupling means and a cam follower pivoted on said third movable pivot axis;
(e) a bellcrank lever having a first arm and a second arm, said bellcrank lever pivoted on said second movable pivot axis;
(f) an output member coupling means connected to said first arm;
(g) said second arm comprising a cam member engaging and cooperating with said cam follower whereby pivotal movement of said floating lever relative to said main lever about said first moving pivot axis is transmitted through said cam follower and said cam member to pivot said bellcrank lever and thus apply a tensioning movement to said output member coupling means;
(h) releasable ratchet means acting between said main lever and said supporting frame whereby pivotal movement of said main lever moves in one angular direction;
(i) stop means mounted on said main lever and cooperating with said floating lever whereby said floating lever is held in an initial position relative to said main lever; and
(j) prestressed spring means coupled to said main lever and said floating lever whereby said floating lever is held against said stop means.

4. A tensioning lever mechanism comprising:
(a) a supporting frame having a fixed pivot axis;
(b) a main lever pivoted about said pivot axis, said main lever having a first movable pivot axis parallel to and spaced from said fixed pivot axis, and a second movable pivot axis parallel to and spaced from said fixed pivot axis and said first movable pivot axis;
(c) a floating lever pivoted on said first movable pivot axis having a third movable pivot axis mounted thereon;
(d) an input member coupling means and a cam follower pivoted on said third movable pivot axis;
(e) a bellcrank lever having a first arm and a second arm, said bellcrank lever pivoted on said second movable pivot axis;
(f) an output member coupling means connected to said first arm;
(g) said second arm comprising a cam member engaging and cooperating with said cam follower whereby pivotal movement of said floating lever relative to said main lever about said first moving pivot axis is transmitted through said cam follower and said cam member to pivot said bellcrank lever and thus apply a tensioning movement to said output member coupling means;
(h) ratchet means comprising a single radially inwardly facing arcuate ratchet mounted on said supporting frame coaxial with said fixed pivot axis and cooperating pawl means pivotally mounted on said main lever;
(i) stop means mounted on said main lever and cooperating with said floating lever whereby said floating lever is held in an initial position relative to said main lever; and
(j) prestressed spring means coupled to said main lever and said floating lever whereby said floating lever is held against said stop means.

5. A tensioning lever mechanism as defined in claim 4, wherein said arcuate ratchet has ratchet teeth with a standard pitch and said pawl means comprises a pair of pawls pivoted coaxially to said main lever about an axis parallel to but spaced from said first moving pivot axis, said pawls engaging said ratchet at points whose distance apart, measured along the length of said ratchet, is an odd multiple of half said pitch of said ratchet teeth.

6. A tensioning lever mechanism as defined in claim 5, in which the pre-loaded spring means comprises a spring assembly carried by the two levers and acting between them to tend to pivot them relative to one another about the movable pivot axis away from a dead-center position in which the line of action of the spring assembly intersects the movable pivot axis.

7. A tensioning lever mechanism as defined in claim 6, in which the spring assembly is pivotally mounted, and in which the line of action of the spring assembly passes through the said dead-center position during the full stroke of travel of the floating lever relative to the main lever in the tensioning direction, the maximum loading of the spring assembly occurring in the dead-center position.

8. A tensioning lever mechanism as defined in claim 7, in which the floating lever is formed with a tail extending inwardly in the generally opposite direction to that of its arm and in which the spring assembly acts between a pivotal anchorage on the tail of the floating lever and a pivotal anchorage on the main lever.

9. An actuating device interposed between an input member and an output member comprising; a stationary frame having a first pivot axis, lever means comprising a main lever pivotally supported on said first pivot axis, a second pivot axis on said main lever spaced from said first pivot axis, said lever means comprising a floating lever pivotally mounted on said second pivot axis, said input member being connected to said floating lever at a point spaced from said second pivot axis and operable when actuated to urge said floating lever to rotate in one direction on said second pivot axis, spring means acting between said levers and urging said floating lever to rotate in the other direction on said second pivot axis, cooperating elements of abutment means on said levers to halt said floating lever in a predetermined position on said main lever in the said other direction of rotation of said floating lever, said spring means providing for rotation of said lever means as a unit about said first pivot axis upon actuation of said input member until a predetermined tension is developed on said input member whereupon said spring means will yield and said main lever will halt while said floating lever continues to rotate on said second pivot axis, cooperating elements of ratchet means on said main lever and said frame operable when effective to prevent rotation of said main lever on said first pivot axis in a direction opposite to the direction in which it is urged by actuation of said input member, and connecting means connecting said output member to said lever means so that rotation of said lever means by actuation of said input member will actuate said output member, said connecting means providing for a predetermined substantially constant drive ratio from said input member to said output member during movement of said lever means as a unit and a constantly increasing drive ratio from said input member to said output member as said floating lever rotates on said second pivot axis.

References Cited by the Examiner
UNITED STATES PATENTS

| | | | |
|---|---|---|---|
| 914,277 | 3/1909 | Howe | 74—518 X |
| 2,985,032 | 5/1961 | Schroder et al. | 74—516 X |
| 3,200,675 | 8/1965 | Willis | 74—516 X |
| 3,217,558 | 11/1965 | Schroter | 74—516 |
| 3,269,213 | 8/1966 | Buchwald | 74—516 |

FOREIGN PATENTS 636,453   1/1928   France.

MILTON KAUFMAN, *Primary Examiner.*